United States Patent [19]
Parkas et al.

[11] Patent Number: 5,779,115
[45] Date of Patent: Jul. 14, 1998

[54] CARRYING DEVICE FOR MOBILE STATION

[75] Inventors: Tapio Parkas, Salo; Jukka Solla, Oulu; Aki Leppänen, Salo, all of Finland

[73] Assignee: Nokia Mobile Phones, Ltd., Salo, Finland

[21] Appl. No.: 658,444

[22] Filed: Jun. 10, 1996

[30] Foreign Application Priority Data

Jun. 30, 1995 [FI] Finland ................................ 953247

[51] Int. Cl.⁶ .................................................. A45F 5/02
[52] U.S. Cl. .......................... 224/272; 224/269; 224/669; 24/3.12; 24/640
[58] Field of Search ............................. 224/269, 271, 224/272, 666, 667, 669; 24/3.11, 3.12, 669, 640, 642; 248/671, 314, 222.11, 223.41, 225.11, 229.12, 229.16; 381/91, 205; 2/300

[56] References Cited

U.S. PATENT DOCUMENTS

| | | | |
|---|---|---|---|
| 231,048 | 8/1880 | Ives | 24/640 |
| 982,298 | 1/1911 | Pollock | 24/3.12 |
| 1,022,663 | 4/1912 | Ehmann | 24/3.12 |
| 1,395,627 | 11/1921 | Binkley | 24/640 |
| 2,954,951 | 10/1960 | Dorothea | 248/671 |
| 4,419,794 | 12/1983 | Horton, Jr. et al. | 224/272 |
| 4,662,041 | 5/1987 | Holmberg | 24/640 |
| 4,916,780 | 4/1990 | Ballet | 24/642 |
| 5,189,632 | 2/1993 | Paajanen et al. | 364/705.05 |
| 5,200,997 | 4/1993 | Leman | 379/428 |
| 5,213,365 | 5/1993 | Fohl | 24/642 |
| 5,214,309 | 5/1993 | Saarnimo | 257/712 |
| 5,229,701 | 7/1993 | Leman et al. | 320/2 |
| 5,253,146 | 10/1993 | Halttunen et al. | 361/784 |
| 5,265,158 | 11/1993 | Tattari | 379/433 |
| 5,271,056 | 12/1993 | Pesola et al. | 379/58 |
| 5,274,885 | 1/1994 | Hellweg | 224/272 |
| 5,361,459 | 11/1994 | Hyvonen et al. | 24/35 |
| 5,472,317 | 12/1995 | Field et al. | 224/271 |
| 5,540,368 | 7/1996 | Oliva | 224/272 |
| 5,620,120 | 4/1997 | Tien | 224/272 |

*Primary Examiner*—Charles R. Eloshway
*Attorney, Agent, or Firm*—Perman & Green, LLP

[57] ABSTRACT

A carrying device which is used together with a mobile station and with which the mobile station can be attached to a target and detached from the place of attachment and re-attached to it. The attachment device comprises a support stud (2) attached to a mobile station (10) and a carrying device (1) attached to a target by way of an attachment element (5), including gripping elements for a detachable grip on the support stud. The gripping elements of the carrying device comprise guide grooves (8) for the reception of the support stud (2) and a tongue (7) moving transversely (6) against the plane (4) of the guide grooves and held by a spring (13) in a locking position (L) extending across the plane of the guide grooves. The carrying device has a hand-operated slide (27) which includes an element (12) to force the tongue against a spring force (F) off the position extending across the plane of the guide grooves, thereby moving it into a release position (R) which releases the support stud.

9 Claims, 2 Drawing Sheets

CARRYING DEVICE FOR MOBILE STATION

The invention relates to a carrying means for an attachment device which is used together with a mobile station and with which the mobile station can be attached to a target and removed from the place of attachment and re-attached to it, when said attachment device comprises: a support stud connected to a mobile phone and a carrying means attached to a target with an attachment element, said carrying means including gripping elements for the detachable grip on the support stud.

As the number of mobile stations increases people need more often to carry these stations, like mobile phones or paging devices, with them. Carrying a phone, for example, in one's hand is inconvenient and as the phone is unattached it is easy to forget to take it along. Carried in a pocket, a mobile station might get bumped or it might fall and get broken. To solve these problems, it has been developed various racks attached to a belt into which a mobile station, particularly a phone, can be attached when not used but carried along. However, a disadvantage of these racks has been their rigid and complex structure and the size of the fastening device attached to the phone. When the phone is attached to a belt vertically, it is not possible to turn it forward or backward around the point of attachment, e.g. when sitting down, and therefore the phone may have caused a feeling of pressure on the user's waist.

Earlier non-public patent application FI-942306 discloses an attachment device to be used together with a mobile station which can be removed from the attachment device and reinstalled into it. The attachment device comprises e.g. a carrying means to be fastened to a belt and a support stud attached to the mobile station with a fitting piece. The carrying means includes gripping elements formed of guide grooves to receive the support stud, and the support stud has a wider end consisting of a flange which reaches said gripping elements before the body part. The gripping elements in the carrying means also include a spring-loaded tongue which yields when a mobile station is pushed into the carrying means an when it is pulled out from the carrying means. While this method of operation is quick and easy, it involves the risk that if the mobile station is unintentionally pushed, e.g. when its user sits down, it comes off inadvertently and may fall.

An object of the invention is to provide a carrying means for a mobile station attachment device like the one described above, which reliably holds a mobile station attached to it so that the mobile station will not come off even if it were pushed with strength. A second object of the invention is to provide such a carrying means, wherein the attachment and detachment of a mobile phone is easy and quick in spite of the attachment reliability mentioned above. A third object of the invention is to provide such a carrying means, which is simple in construction and simple and economical to manufacture. An object of the invention is particularly to provide a carrying means for an attachment device which can be attached to the clothing of the person carrying it and which allows the mobile station to turn with respect to the point of attachment and with which the mobile station can be attached to another target, such as a rack or the like in a car or elsewhere.

These objects are achieved with the carrying means according to the invention, the main characteristics of which are disclosed in the claims attached hereto.

For reasons of simplicity, the invention will be described with the assumption that the mobile station is a phone attached to the user's belt. It is clear that the carrying means according to the invention can also be used in conjunction with other mobile stations, such as paging devices, and it can be attached to other garments as well, e.g. to the waist of a skirt or trousers, the brim of a pocket etc.; to the brim of a bag or to other locations in these items and to other appropriate targets, such as parts, devices or equipment or the like in a vehicle or elsewhere. To that end, the carrying means in question is attached to the target in an appropriate way.

The attachment device, to which the invention relates, comprises two parts: an attachment device carrying means, which remains on the belt when the phone is being used, and a support stud attached to the phone with a fitting piece. The phone is locked onto the belt and detached from it by means of a locking tongue. While on the belt, the phone can be turned around the axis of the support stud when necessary, whereby the user can, e.g. when sitting, easily turn the phone forward or backward around the axis of the support stud so that the phone will not press the user's waist. The phone can easily be removed from the belt by pushing down the slide in the attachment device carrying means attached to the belt and at the same time lifting the phone up. The construction according to the invention facilitates easy removal of the phone from the belt without breaking or scratching the belt or the phone. When attaching the phone to the belt, the user only has to push the phone down to the carrying means of the attachment device, whereby the phone is locked to the body part by means of a locking tongue acting in a spring-like manner and an inward-bent flange-like edge circling the body part.

The invention is described in more detail with reference to the accompanying drawing.

Figure 1A:
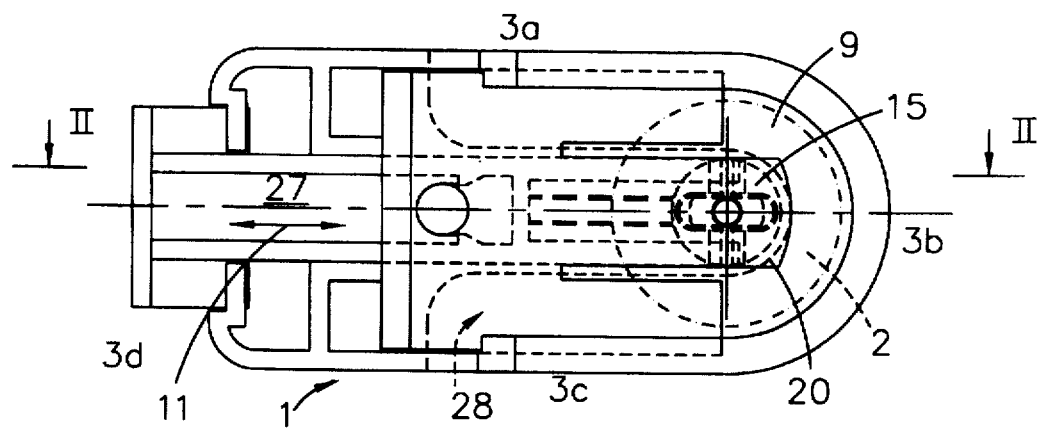
FIG. 1A shows the carrying means according to the invention as seen from above, in direction I of FIG. 1B, through the attachment plate, and the means in the locking position. The support stud of the mobile station is represented by a dashed-and-dotted line.
Figure 1B:
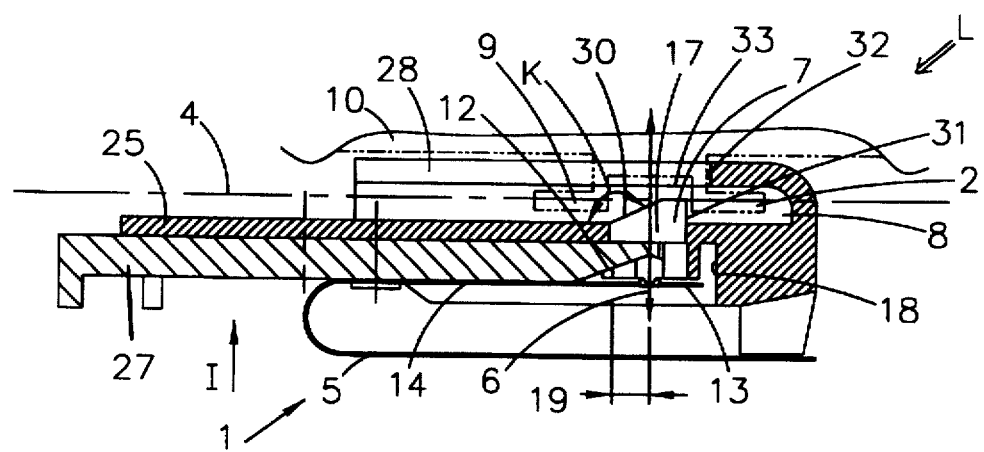
FIG. 1B is a profile drawing of the carrying means of FIG. 1A along plane II—II with the means in the locking position. The support stud of the mobile station is represented by a dashed-and-dotted line.

The figures describe a carrying means 1 for the attachment device of a mobile station 10, with which the mobile station can be attached to the user's belt or other garment and, when necessary, removed from that place and re-attached to it. To this end, the attachment device of the mobile station comprises, firstly, the carrying means 1 shown in the figures and attached to the user's clothing and having gripping elements to receive the support stud 2 of a mobile station. In FIGS. 1A and 1B, the dashed-and-dotted line depicts part of a mobile station and the support stud 2 attached to it. The carrying means 1 has on three sides 3a, 3b and 3c inward-opening guide grooves 8 which are located on one plane 4 and which are formed by the channels between the edges 28 and the carrying means body 25, the channels of the two opposite sides 3a and 3c being parallel to each other and the third channel of side 3b in the middle transverse to the other two. On one end of the support stud 2 in the mobile station 10 there is a wider circular flange 9 and between the flange and the mobile station 10 a narrower neck part 32. On the fourth side 3d of the carrying means there is no guide groove, whereby the flange on the end of the support stud 2 can be pushed from the fourth side 3d into the guide grooves 8 in the direction 11 of the plane 4 of the guide grooves. In this same direction 11, the support stud 2 can be removed from the guide grooves when the locking, which will be discussed below, has been removed in the release position R. When the support stud has a circular flange 9 in the guide grooves 8 or the support stud can revolve about its mounting axis, it can rotate and allows the mobile station to turn when needed. However, a tongue 7 which is pushed into the support stud prevents the mobile station from being detached from the carrying means. The support stud 2 is attached to the mobile station in any practical manner not described in this document.

To lock the support stud 2 and thus the mobile station 10 into the carrying means 1, the carrying means includes a tongue 7 or a corresponding element which moves transversely to the plane 4 of the guide grooves 8. When this tongue 7 is in the locking position L shown in FIGS. 1A and 1B, it protrudes across the plane 4 of the guide grooves and thus into the hollow 33 in the middle of the outer end of the flange 9 on the end of the support stud. As can be seen from FIG. 1B, this tongue 7 prevents the support stud 2 from being removed from the guide grooves 8 in direction 11 when the tongue is in the locking position L. In the construction of the invention, a spring 13 exerts a force F against said tongue 7 so that the latter stays in the locking position L extending across the plane of the guide grooves.

Figure 2A:
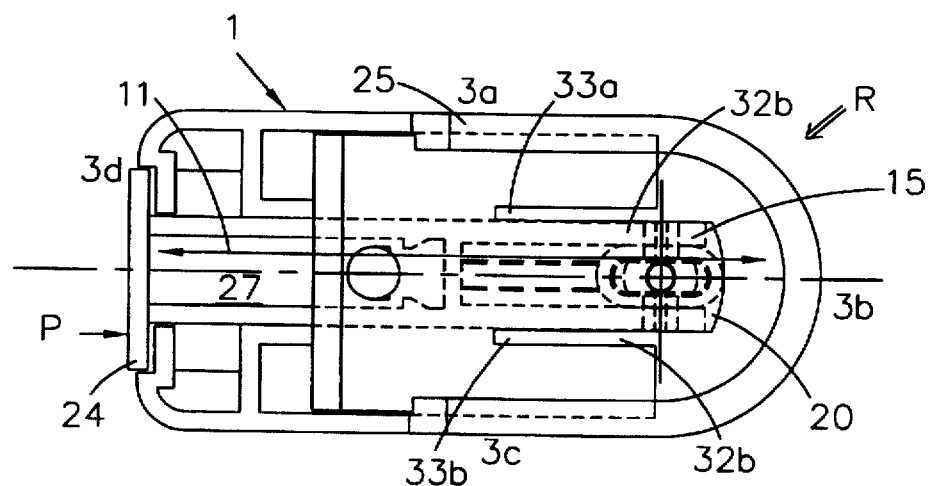
FIG. 2A shows the carrying means according to the invention as seen from above in the same direction as in FIG. 1A., through the attachment plate and the means in the detachment position.
Figure 2B:
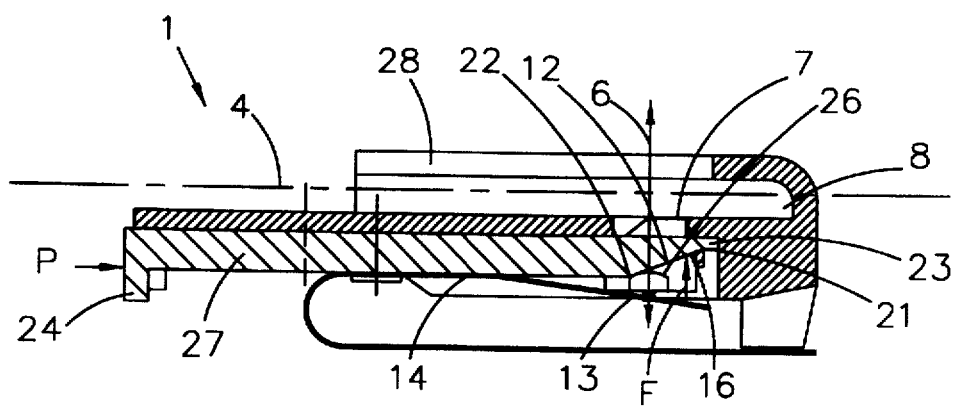
FIG. 2B is a profile drawing of the carrying means according to the invention in the same direction as in FIG. 1B and the means in the detachment position, corresponding to the functional status shown in FIG. 2A.

In addition, the carrying means 1 includes a slide 27 which moves parallel to the plane 4 of the guide grooves and contains a transfer element 12 to force the tongue 7 against the spring force F so that it comes off the position extending across the plane of the guide grooves. FIGS. 2A and 2B illustrate a situation in which the slide 27 has forced the tongue 7 away from the plane 4 of the guide grooves, and particularly away from the plane for a distance corresponding to the height of the guide grooves, whereby the guide grooves 8 and the area between them are completely free from obstacles, which enables the free removal of the support stud and its flanges from the carrying means. Then the tongue 7 is in the release position R, which releases the support stud 2 and which according to the invention is brought about by means of the slide 27, pressed in direction P by the user. In principle, the slide can be made to move in another direction than that of the plane of the guide grooves; say, transversely to that plane 4.

Typically, the slide 27 moves in the carrying means body 25 in a direction of the 35 guide groove plane 4. An advantageous direction P is identical with direction 11 along which the support stud 2 of a mobile station is brought to the guide grooves 8 and removed from them. It is also possible to have the slide 27 move in another direction, say, transversely to said moving direction 11 of the support stud. However, the embodiments shown in the figures employ the advantageous embodiment mentioned above, because then it is easy to press the slide on its applying end 24 in direction P while the mobile station 10 is attached to the carrying means. In any case, the slide 27 includes a transfer element 12 comprising a wedge surface 16 which is located on that side of the slide which faces away from the plane of the guide grooves. The thinner edge 21 of the wedge surface 16 is located away from the applying end 24 of the slide and the thicker edge 22 of the wedge surface 16 is located closer to the applying end 24 of the slide. So, the wedge surface constitutes a wedge-shaped element in the slide in the preferred embodiment of the invention.

Advantageously, the transfer element 12 comprises as continuations of the thinner edge 21 of the wedge surface 16 straighter projections 23 which rest against the sliding surface 26 of the tongue 7 when the tongue is in the locking position L. This is to ensure that the wedge surface 16 is all the time in contact with one surface only to achieve operational reliability.

When the slide 27 is in the locking position L, the wedge element and thus the wedge surface 16, or, to be more precise, the thicker edge 22 of the wedge surface, is located at a distance 19, in the direction P of the movement of the slide, from the tongue 7, or, to be more precise, from the parts of the tongue 7 that interact with the wedge surface 16. Then a spring 13 can freely press the tongue 17 into the locking position L without being prevented by the transfer element. When the user presses the slide at the applying end 24 in direction P, the wedge surface of the transfer element 12 moves against the counter surfaces 26 of the tongue or spring so that they are settled against the thicker edge 22 of the wedge surface, as shown in FIG. 2B, whereby the tongue 7 is in the release position R. Then the wedge surface 16 of the transfer element has forced the tongue to move away from the plane of the guide grooves in a direction transverse to the plane 4 of the guide grooves, for a distance corresponding to the difference in the thickness of the thinner edge 21 and thicker edge 22 of the wedge, as can be clearly seen from FIG. 2B. Then the guide grooves 8 are free, as described above.

The transfer element 12 may be considerably different from what has been described above. Especially if the slide moves in a direction other than that of the plane 4 of the guide grooves, the transfer element is of another type than the wedge-shaped piece described above. In general, it can be said that the transfer element is any construction part or shaped item of a construction part in the carrying means that can move the tongue 7 or a corresponding element against a spring force F into the release position R when pressed by the user. Thus, the transfer element may also be an appendage or a shape in the tongue.

The tongue 7 may be a separate piece 17 that can move against the plane 4 of the guide grooves, directed by transverse guiding surfaces 18, as shown in the figures. Alternatively, the tongue may be a piece attached to a spring or to the free end of the spring slip shown in the figures, whereby the movement of the spring guides it against the plane 4 of the guide grooves in the transverse direction. The tongue 7 may also be a projection shaped in the spring or in the spring slip shown in the figures, composed of the material of said spring or spring slip. In any case, the tongue piece 17 or a corresponding projection is located on that side of the spring or spring plate 14 that faces the guide grooves 8. In the advantageous embodiment: of the figures, the separate piece 17 constituting the tongue 7 is substantially T-shaped, whereby the vertical branch of the T-shape constitutes those edges 30 and 31 of the tongue 7 that extend across the plane 4 of the guide grooves. The horizontal branch of the T-shape is located in the direction of the plane 4 of the guide grooves on that side of the wedge surfaces 16 of the slide that is facing away from the plane 4 of the guide grooves, as can be clearly understood from FIGS. 1B and 2B. These horizontal branches of the T-shape contain sliding surfaces 26 against which the wedge surfaces 16 are pressed to move the tongue 7 against a spring force, from the locking position L to the release position R. To that end, the portion constituting the transfer element 12 in the slide 27 has two branches, namely, branches 32a and 32b which extend across the two sides of the vertical branch of the T-shape to press the two sliding surfaces 26 of the horizontal branch of the T-shape.

In principle, the spring 13 that presses the tongue 7 to the locking position L extending across the plane 4 of the guide grooves can be of any suitable type. However, it is advantageous to use a bending spring made of a plate 14 of a suitable elastic material, like metal, and located mainly parallel to the plane 4 of the guide grooves, as shown in the figures. This plate 14 is fixed by its edges to the body 25 of the carrying means, thereby constituting the rear surface of the carrying means facing away from the guide grooves 8. A slip 15 is formed in this plate 14 of an elastic material by means of cut-outs 33a,b thus creating a sufficiently long and suitably flexible shape that has a spring force F which holds the tongue 7 in its locking position L, and yet the tongue 7 can be moved away from the locking position into the release position R with a relatively light movement of the slide 27. So, particularly, the tongue 7 is formed in the free end 20 of the spring slip 15 or this free end 20 presses a tongue formed of a separate piece 17, as shown in the figures. In the preferable embodiment said spring formed of a plate 14 continues in the form of a U-bend away from slip 15, whereby it, being long enough, constitutes an attachment plate 5 for the carrying means, with which the carrying means can be attached to a belt or other location in the clothes. Of course, the carrying means can be attached to the clothes in other ways, too. The applying end 24 of the slide is thus located on the carrying means'side 3d that has no guide groove, as is the U-bend of the elastic-material plate 14. Thereby, when the carrying means is attached to the clothes, say, to a belt or waistband or the brim of a pocket, the applying end 24 of the slide is substantially facing up, thereby being easy to use. For a target another than clothes, bags and other accessories the attachment plate 5 of the carrying means can of course be of quite a different type and be composed of fasteners of types required in each particular case. The attachment plate can be a multipurpose fastener and/or it can be replaceable, for example.

According to the invention, two of those edges of the tongue 7 that extend across the plane 4 of the guide grooves 8 are shaped in a special manner. One edge 30 of the tongue on the side of the side 3d without a guide groove is bevelled such that, relative to the guide groove plane, it forms an angle of incidence K, which is over 90° and typically in the range of 120° to 150°. Because of this, there is no need to use the slide 27 when pushing the support stud 2 of a mobile station into the guide grooves 8, but the support stud flange 9 presses the bevelled edge 30 and thus the tongue 7 against a spring force F, enabling the support stud to be pressed into the locking position, wherein the spring 13 presses the tongue 7 into the locking hollow 33 in the support stud. A second edge 31 of the tongue on the side of the middle side 3b having a guide groove 8 is shaped substantially perpendicular to the guide groove plane 4, whereby pushing the mobile station and thus forcing the support stud 2 in direction 11 does not make the tongue 7 move against the spring force but, in order to release the support stud one has to use the slide 27 as described above. In the mobile station 10, to make sure that the support stud 2 stays securely in its position, it is advantageous that the edges of the locking hollow 33 in the support stud are approximately perpendicular to the guide groove plane 4, whereby, when the mobile station is inadvertently pushed, these surfaces transverse to plane 4 meet and the tongue 7 does not yield.

We claim:

1. A carrying device for use with a mobile station whereby the mobile station can be detachably attached to a target, the mobile station being of the type having a support stud (2) with a circular flange (9), the circular flange (9) having a cavity (33) in the middle thereof, the carrying device comprising:

an attachment element (5) for attaching the carrying device to the target;

gripping elements comprising guide grooves (8) disposed in a plane for slidably receiving the circular flange (9) therein;

a tongue (7) adapted to be received in the cavity (33) of the circular flange (9) and being movable in a direction transverse to the plane containing the guide grooves (8);

a spring (13) having a given spring force (F) for biasing the tongue (7) into a locking position (L) wherein the tongue (7) extends across the plane containing the guide grooves (8) and into the cavity (33) of the circular flange (9) to secure the mobile station to the carrying device while permitting rotational movement of the mobile station relative to the carrying device; and a movable slide (27) having a transfer element (12) for forcing the tongue (7) against the bias of the spring force (F) out of the locking position (L) and into a release position (R) wherein the tongue is displaced from the cavity (33) of the circular flange (9) so that the circular flange (9) may slide along guide grooves (8) for removal of the mobile station from the carrying device.

2. A carrying device for use with a mobile station according to claim 1, characterized in that the spring (13) is formed of an elastic material and is positioned parallel to the plane containing the guide grooves (8), biasing the tongue (7) into the locking position (L).

3. A carrying device for use with a mobile station according to claim 2, characterized in that the spring (13) forms the rear surface of the carrying device and is integral with attachment element (5).

4. A carrying device for use with a mobile station according to claim 1, characterized in that the slide (27) has an applying end (24) and an opposite end, the transfer element (12) being located at the opposite end of the slide (27) and comprising a wedge surface (16) which faces away from the plane containing the guide grooves (8), the wedge surface tapering from a thicker edge to a thinner edge (21), the spring (13) having a sliding surface (26) against which the wedge surface (16) acts, whereby when force is applied to the applying end (24) of the slide (27), the thicker edge of the wedge surface (16) is pressed against the sliding surface (26) to force the tongue (7) against the bias of the spring force (F) into the release position (R).

5. A carrying device for use with a mobile station according to claim 1, characterized in that the guide grooves (8) comprise three guide grooves forming a U-shape, the transfer element (12) comprising a wedge surface (16) tapering from a thicker edge to a thinner edge (21), the thinner edge (21) having a projection (23), the spring (13) having a sliding surface (26) against which the projection (23) rests, the slide (27) having an applying end (24) which is located adjacent the open end of the U-shape formed by the guide grooves (8), the slide (27) being movable in a direction parallel to the legs of the U-shape formed by the guide grooves (8).

6. A carrying device for use with a mobile station according to claim 1, characterized in that slide (27) is movable in a plane parallel to the plane containing the guide grooves (8), the guide grooves (8) forming a U-shape for sliding reception of the circular flange (9) therein such that, when it is desired to secure the mobile station to the carrying device, the circular flange (9) is pushed along the guide grooves (8) until tongue (7) is moved into the locking position (L).

7. A carrying device for use with a mobile station according to claim 1, characterized in that the guide grooves (8)

form a U-shape, the tongue (7) having a beveled first edge (30) facing the open side of the U-shape defined by the guide grooves (8) and a second edge (31) facing the closed side of the U-shape defined by the guide grooves (8), the second edge (31) being substantially perpendicular to the plane containing the guide grooves (8), the beveled first edge (30) forming an angle of incidence (K) of greater than 90 degrees with the plane containing the guide grooves (8).

8. A carrying device for use with a mobile station according to any one of the preceding claims, characterized in that the target is a person's clothing or a piece of equipment.

9. A carrying device for use with a mobile station whereby the mobile station can be detachably attached to a target, the mobile station being of the type having a support stud (2) with a circular flange (9), the circular flange (9) having a cavity (33) in the middle thereof, the carrying device comprising:

an attachment element (5) for attaching the carrying device to the target;

gripping elements comprising guide grooves (8) disposed in a plane for slidably receiving the circular flange (9) therein, the guide grooves (8) forming a U-shape;

a tongue (7) adapted to be received in the cavity (33) of the circular flange (9) and being movable in a direction transverse to the plane containing the guide grooves (8), the tongue (7) having a beveled first edge (30) facing the open side of the U-shape defined by the guide grooves (8) and a second edge (31) facing the closed side of the U-shape defined by the guide grooves (8), the second edge (31) being substantially perpendicular to the plane containing the guide grooves (8), the beveled first edge (30) forming an angle of incidence (K) of greater than 90 degrees with the plane containing the guide grooves (8);

a spring (13) having a given spring force (F) for biasing the tongue (7) into a locking position (L) wherein the tongue (7) extends across the plane containing the guide grooves (8) and into the cavity (33) of the circular flange (9) to secure the mobile station to the carrying device; and a movable slide (27) having a transfer element (12) for forcing the tongue (7) against the bias of the spring force (F) out of the locking position (L) and into a release position (R) wherein the tongue is displaced from the cavity (33) of the circular flange (9) so that the circular flange (9) may slide along guide grooves (8) for removal of the mobile station from the carrying device.

* * * * *